US012675711B2

(12) United States Patent
Liu et al.

(10) Patent No.: US 12,675,711 B2
(45) Date of Patent: Jul. 7, 2026

(54) SYSTEMS AND METHODS FOR DYNAMIC HARDWARE CONFIGURATION

(71) Applicant: Apple Inc., Cupertino, CA (US)

(72) Inventors: Jia Liu, Munich (DE); Aditya Singh Tomar, Taufkirchen (DE); Kushal M. Chawda, San Jose, CA (US); Sumit Saxena, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1455 days.

(21) Appl. No.: 17/320,978

(22) Filed: May 14, 2021

(65) Prior Publication Data

US 2022/0366278 A1 Nov. 17, 2022

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,051,227 | B2 | 5/2006 | Kazachinsky et al. |
| 9,411,714 | B2 | 8/2016 | Hesse |
| 9,626,227 | B2 | 4/2017 | Sun et al. |
| 9,674,779 | B2 | 6/2017 | Szabo et al. |
| 9,691,034 | B2 | 6/2017 | Lee et al. |
| 10,146,286 | B2 * | 12/2018 | Lee .......................... G06F 1/324 |
| 10,228,738 | B2 | 3/2019 | Zelikson et al. |
| 10,234,930 | B2 | 3/2019 | Lee et al. |
| 10,440,577 | B1 | 10/2019 | Vasseur et al. |
| 10,470,134 | B2 | 11/2019 | Kim et al. |

(Continued)

FOREIGN PATENT DOCUMENTS

| | | |
|---|---|---|
| CN | 111611197 A | 9/2020 |
| IN | 201821011439 | 7/2020 |

(Continued)

OTHER PUBLICATIONS

"Adaptive finite state machine based visual autonomous navigation system", https://www.sciencedirect.com/science/article/pii/S0952197613002406?_cf_chl_tk=5DH4s20WJwmmTIC_VS1XxYKEV.NDpPgWFdi9MiklbAI-1740159289-1.0.1.1-rFb3H.LW2av3Z1P_ftFZUEPW5xW2w20goOp9shctSac#f0005 t, Sales et al (Year: 2014).*

(Continued)

*Primary Examiner* — Haimei Jiang
(74) *Attorney, Agent, or Firm* — FLETCHER YODER PC

(57) ABSTRACT

Systems and methods for configuring hardware resources of an electronic device based on operating characteristics of the electronic device are provided. In one embodiment, a processor may configure the hardware resources of the electronic device that equally weighs decisions made by a machine learning (ML) engine and a finite state machine (FSM) engine. In another embodiment, the processor may configure the hardware resources of the electronic device that gives greater weight to decisions made by the ML engine compared to decisions made by the FSM engine. In yet another embodiment, the processor may configure the hardware resources of the electronic device that gives greater weight to decisions made by the FSM engine compared to decisions made by the ML engine.

20 Claims, 7 Drawing Sheets

(56) References Cited

U.S. PATENT DOCUMENTS

| | | | |
|---|---|---|---|
| 10,560,899 | B2 | 2/2020 | Sharma et al. |
| 10,849,066 | B2 | 11/2020 | Sue et al. |
| 10,942,562 | B2 | 3/2021 | Qawami et al. |
| 10,983,584 | B2 | 4/2021 | Choi et al. |
| 11,113,625 | B2 * | 9/2021 | Assem Aly Salama .................... H04L 41/16 |
| 2005/0239518 | A1 | 10/2005 | D'Agostino et al. |
| 2013/0243252 | A1 * | 9/2013 | Xu ......................... G08B 23/00 382/103 |
| 2018/0199397 | A1 * | 7/2018 | Skillermark .......... H04W 76/11 |
| 2018/0218276 | A1 | 8/2018 | Suman |
| 2018/0287926 | A1 * | 10/2018 | Williams .............. H04L 41/082 |
| 2019/0236450 | A1 | 8/2019 | Li et al. |
| 2019/0244129 | A1 | 8/2019 | Tabuchi et al. |
| 2019/0251469 | A1 | 8/2019 | Wagstaff et al. |
| 2020/0134374 | A1 * | 4/2020 | Oros ........................ G06N 3/09 |
| 2020/0410389 | A1 * | 12/2020 | Jain ........................ G06N 20/00 |
| 2021/0065649 | A1 * | 3/2021 | Saa-Garriga ........... G06N 3/098 |
| 2021/0208189 | A1 * | 7/2021 | Flores ................. G06F 11/0751 |
| 2021/0241134 | A1 * | 8/2021 | Burbank ................ G06Q 10/10 |
| 2021/0349519 | A1 * | 11/2021 | Agrabawi .............. G06N 20/00 |

FOREIGN PATENT DOCUMENTS

| | | |
|---|---|---|
| WO | 2014200692 A1 | 12/2014 |
| WO | 2020035870 A1 | 2/2020 |

OTHER PUBLICATIONS

Choudhury, Priyanka et al.; Power Modeling of Power Gated FSM and Its Low Power Realization by Simultaneous Partitioning; Springer-Verlag Berlin Heidelberg; 2012; pp. 19-29; Agartala, India.

"On the need for random access during SCG activation," 3GPP TSG-RAN WG2 #113e eletronic meeting, R2-2101095, Jan. 25, 2021-Feb. 5, 2021, 11 pages.

"Further Considerations on Efficient SCG Activation/Deactivation," 3GPP TSG-RAN WG2 #113 electronic meeting, R2-2101235, Jan. 25, 2021-Feb. 5, 2021, 5 pages.

"Efficient SCG Activation mechanism," 3GPP TSG-RAN WG2 Meeting #112-e electronic meeting, R2-2010283, Nov. 2-13, 2020, 3 pages.

"Open issues for activation of deactivated SCG," 3GPP TSG-RAN WG2 Meeting #113 bis electronic meeting, R2-2102899, Apr. 12-20, 2021, 6 pages.

* cited by examiner

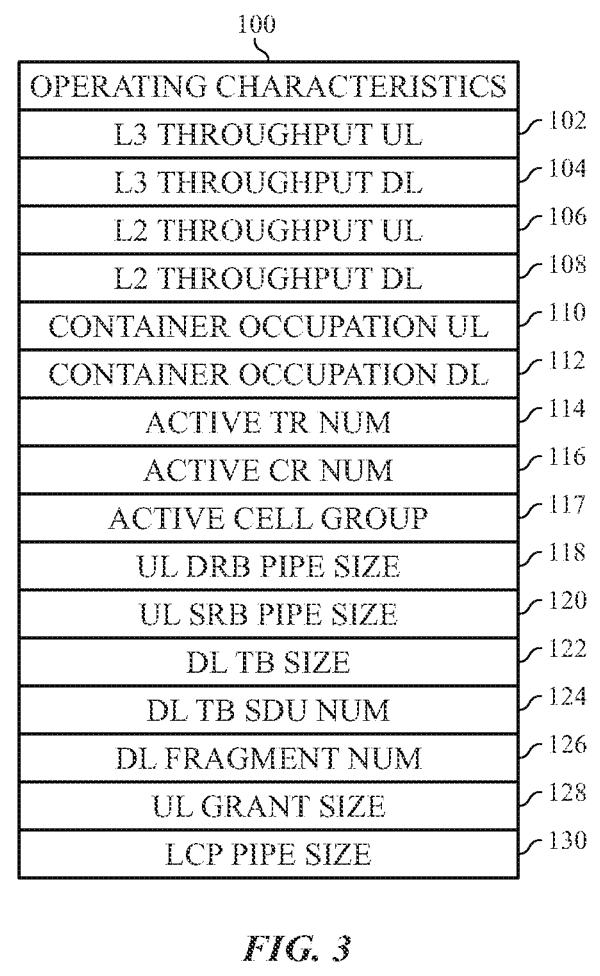

100

| OPERATING CHARACTERISTICS | |
|---|---|
| L3 THROUGHPUT UL | 102 |
| L3 THROUGHPUT DL | 104 |
| L2 THROUGHPUT UL | 106 |
| L2 THROUGHPUT DL | 108 |
| CONTAINER OCCUPATION UL | 110 |
| CONTAINER OCCUPATION DL | 112 |
| ACTIVE TR NUM | 114 |
| ACTIVE CR NUM | 116 |
| ACTIVE CELL GROUP | 117 |
| UL DRB PIPE SIZE | 118 |
| UL SRB PIPE SIZE | 120 |
| DL TB SIZE | 122 |
| DL TB SDU NUM | 124 |
| DL FRAGMENT NUM | 126 |
| UL GRANT SIZE | 128 |
| LCP PIPE SIZE | 130 |

*FIG. 3*

| | OFF | LOW1 | LOW2 | LOW3 | MID1 | MID2 | MID3 | HIGH1 | HIGH2 | HIGH3 |
|---|---|---|---|---|---|---|---|---|---|---|
| CPU1 | ✸ | □ | | | □ | ◁ | ○ | | | |
| SRAM1 | ✸ | □ | | | □ | ◁ | ○ | | | |
| DRAM1 | ✸ | □ | | | □ | ◁ | ○ | | | |
| NOC1 | ✸ | □ | | | □ | | ◁ | | | ○ |
| CPU2 | ✸ | □ | | | □ | | ◁ | | | ○ |
| DRAM2 | ✸ | □ | | | □ | | ◁ | | | ○ |
| NOC2 | ✸ | □ | | | □ | | ◁ | | | ○ |
| HW1 | ✸ | □ | | | □ | | ◁ | | | ○ |
| HW2 | ✸ | □ | | | □ | | ◁ | | | ○ |

○ DOWNLOADING (GOOD SIGNAL QUALITY, HIGH DATA RATE)
◁ DOWNLOADING (BAD SIGNAL QUALITY, LOW DATA RATE)
□ VOICE CALLING (SWITCHING BETWEEN MID1 AND LOW1 (LIGHT SLEEP))
✸ AIRPLANE MODE (DEEP SLEEP)

SYSTEMS AND METHODS FOR DYNAMIC HARDWARE CONFIGURATION

BACKGROUND

The present disclosure relates generally to resource and state management of an electronic device, and more specifically to configuring hardware resources of the electronic device using machine learning and/or a finite state machine.

An electronic device, such as a phone, tablet, or other portable electronic device, may include resource and state management logic (e.g., software and/or circuitry). The resource and state management logic may collect various system information or operating characteristics (e.g., power gating, clock gating, frequency that operations are performed, and so on) of the electronic device and make real-time decisions to configure hardware resources of the electronic device based on the collected system information or operating characteristics. In some cases, the resource and state management logic may use a finite state machine to make the decisions, and in other cases, the resource and state management logic may use machine learning to make the decisions. However, with increasingly complex device operation and many more operating characteristics (e.g., system inputs), the finite state machine may take excessively long or inefficiently make the decisions. On the other hand, machine learning may be less deterministic than the finite state machine, which may lead to worse or unacceptable performance when compared to the finite state machine.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a computing device may include hardware components communicatively coupled to a processor. The processor may receive one or more operating characteristics of the computing device. In response to determining that the one or more operating characteristics are associated with using a finite state machine engine, the processor may execute the finite state machine engine to generate a finite state machine decision based on the one or more operating characteristics. The processor may configure the hardware components based on the finite state machine decision. However, in response to determining that the one or more operating characteristics are not associated with using the finite state machine engine, the processor may execute a machine learning engine to generate a machine learning decision based on the one or more operating characteristics. The processor may configure the hardware components based on the machine learning decision.

In another embodiment, a non-transitory computer-readable medium may include computer-executable instructions that are executed by a processor. The computer-executable instructions may cause the processor to receive one or more operating characteristics of a computing device, and execute a machine learning engine to generate a machine learning decision based on the one or more operating characteristics. In response to determining that the machine learning decision and the one or more operating characteristics are associated with using a finite state machine engine, the computer-executable instructions may cause the processor to execute the finite state machine engine to generate a finite state machine decision based on the one or more operating characteristics. Further, the computer-executable instructions may cause the processor to configure one or more hardware components of the computing device based on the finite state machine decision. However, in response to determining that the machine learning decision and the one or more operating characteristics are not associated with using the finite state machine engine, the computer-executable instructions may cause the processor to configure the one or more hardware components based on the machine learning decision.

In yet another embodiment, according to method, a processor may receive one or more operating characteristics of an electronic device. The processor may execute a machine learning engine to generate a machine learning decision based on the one or more operating characteristics. Further, the processor may execute a finite state machine engine using the one or more operating characteristics and the machine learning decision as inputs to generate a finite state machine decision. Based on the finite state machine decision, the processor may configure hardware components of the electronic device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 3 is a table of example operating characteristics (e.g., system inputs) of the electronic device of FIG. 1 related to cellular operation, according to embodiments of the present disclosure;

DETAILED DESCRIPTION OF SPECIFIC EMBODIMENTS

Figure 1:
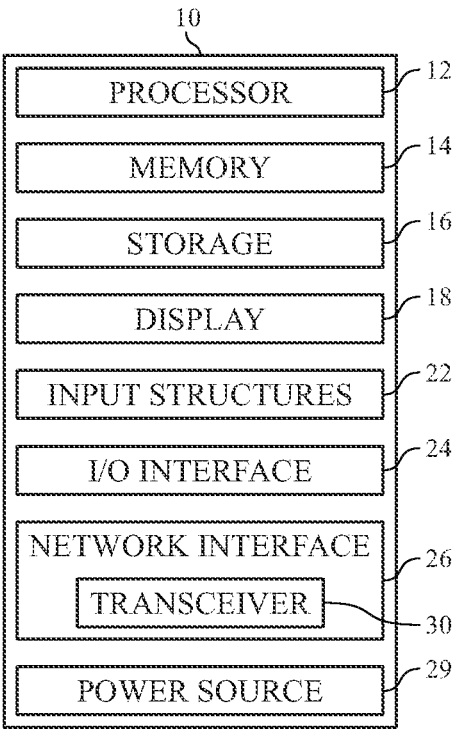
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to configuring hardware resources (e.g., central processing unit (CPU), memory) of an electronic device based on operating characteristics of the electronic device (e.g., power gating characteristics, clock gating characteristics, network conditions, switching from a high power mode to a low power mode). As used herein, the electronic device may include a phone, tablet, laptop or other portable electronic device. In some embodiments, the electronic device may include a system on chip (SoC) that integrates the hardware resources of the electronic device. Further, the system on chip (SoC) may include a processor (e.g., including resource and state management (RSM) logic) that collects various system information of the electronic device and makes real-time decisions to configure hardware resources, such that the hardware resources may address the operating characteristics.

When the electronic device exhibits certain operating characteristics, a processor of the electronic device may execute a finite state machine (FSM) engine or a machine learning (ML) engine to configure the hardware resources to meet resource and state management (RSM) goals. When the electronic device includes complex or numerous operating characteristics (e.g., system inputs), decisions made by the FSM engine may be unreliable. With numerous system inputs, it may difficult for the FSM engine to map or track every potential state transition and output. Instead, the ML engine may provide faster and more accurate decisions for RSM. However, exclusively relying on decision made by the ML engine may also be problematic since insufficient training data may lead to a biased or less deterministic ML decision. As such, to ensure that the electronic device performs efficiently, the processor may configure the hardware resources by selecting a FSM decision, a ML decision, or both, depending on the certain operating characteristics of the electronic device.

Embodiments herein provide apparatuses and techniques to increase or optimize power and performance efficiency of the electronic device by configuring the hardware resources based on operating characteristics of the electronic device. In some embodiments, after receiving the operating characteristics of the electronic device, the processor may determine whether to configure the hardware resources based on executing the FSM engine or the ML engine. If the operating characteristics of the electronic device are not associated with using the FSM engine, then the processor may execute the ML engine to generate a ML decision and configure the hardware resources based on the ML decision.

For example, certain operating characteristics, such as determining a location of the electronic device or determining that the electronic device is traveling, may be associated with the FSM. Additionally, the ML engine may generate a decision to configure the hardware resources of the electronic device to enter a high performance state when signal quality is good (e.g., to take advantage of the good signal quality), and to enter a low performance state when signal quality is poor (e.g., so as to not waste system resources when operating with the poor signal quality). As an example, a user may download files via the electronic device in a location or while traveling, such that the electronic device is subject to various signal qualities, from good to poor signal quality. For example, the location may be a large building or office complex, or the electronic device may be on a moving train. If the processor is unable to determine the location of the electronic device, or determine that the electronic device is traveling, then the processor may execute the ML engine to generate ML decisions that configure the hardware resources to frequently switch between the high performance state and the low performance state as signal quality changes. The frequent switching between the high performance state and the low performance state may consume excessive power due to repeatedly powering on and off hardware components of the electronic device.

However, if the processor is able to identify the location of the electronic device, or determine that the electronic device is traveling, then the processor may execute the FSM engine and configure the hardware resources based on the FSM decision. That is, the processor may cause the hardware resources to execute in a specified performance state (e.g., high or low) corresponding to the identified location or the traveling status of the electronic device using the FSM decision. By configuring the hardware resources based on the FSM decision when the operating characteristics are associated with using the FSM engine, the processor may prevent frequent switching between the high performance mode and the low performance mode, thereby decreasing energy consumption.

In other embodiments, after receiving an indication of the operating characteristics, the processor may execute the ML engine by default to generate the ML decision. If the machine learning decision and the operating characteristics are not associated with using the FSM engine, then the processor may configure the hardware resources based on the ML decision. For example, when the electronic device is performing low-traffic tasks (e.g., applications running in background), the processor may execute the ML engine by default, which may generate a ML decision to configure the hardware resources to enter a deep sleep mode to minimize power consumption.

However, if the processor determines that the ML decision and the operating characteristics are associated with using the FSM engine, then the processor may execute the FSM engine to generate a FSM decision based on the operating characteristics, and configure the hardware resources based on the FSM decision. For example, an operating characteristic associated with using the FSM engine may include the electronic device performing the low-traffic tasks that are associated with time-critical services (e.g., online gaming). For this operating characteristic, the FSM engine may generate an FSM decision to configure the hardware resources to enter a light sleep mode, so that the hardware resources may recover faster than when in the deep sleep mode. The processor may then execute the FSM engine, such that the hardware resources enter the light sleep to account for the operating characteristics (e.g., time-critical services) associated with the FSM engine.

In additional embodiments, after receiving the operating characteristics of the electronic device, the processor may execute the ML engine to generate the ML decision. Using the ML decision and the operating characteristics as inputs, the processor may execute the FSM engine. The processor may configure the hardware resources based on the finite state machine FSM decision. Using the previous example, when the electronic device is performing applications that allow deep sleep, the processor may configure the hardware resources based on the FSM decision that takes into account operating characteristics (e.g., type of application being executed) of the electronic device and the ML decision with respect to deep sleep.

In this manner, the processor is able to suitably configure hardware resources based on operating characteristics of the electronic device to increase or optimize power and efficiency of the electronic device. It can be appreciated that the processor may execute the ML engine, FSM engine, or both, based on analyzing particular operating characteristics. In cases with increasingly complex device operations and numerous operating characteristics, the processor may execute the ML engine to generate a decision that quickly and efficiently configures the hardware resources compared to a decision from the FSM engine. When operating characteristics are associated with using the FSM engine, the processor may execute the FSM engine to generate a more deterministic decision compared to the ML engine to configure the hardware resources.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas. The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
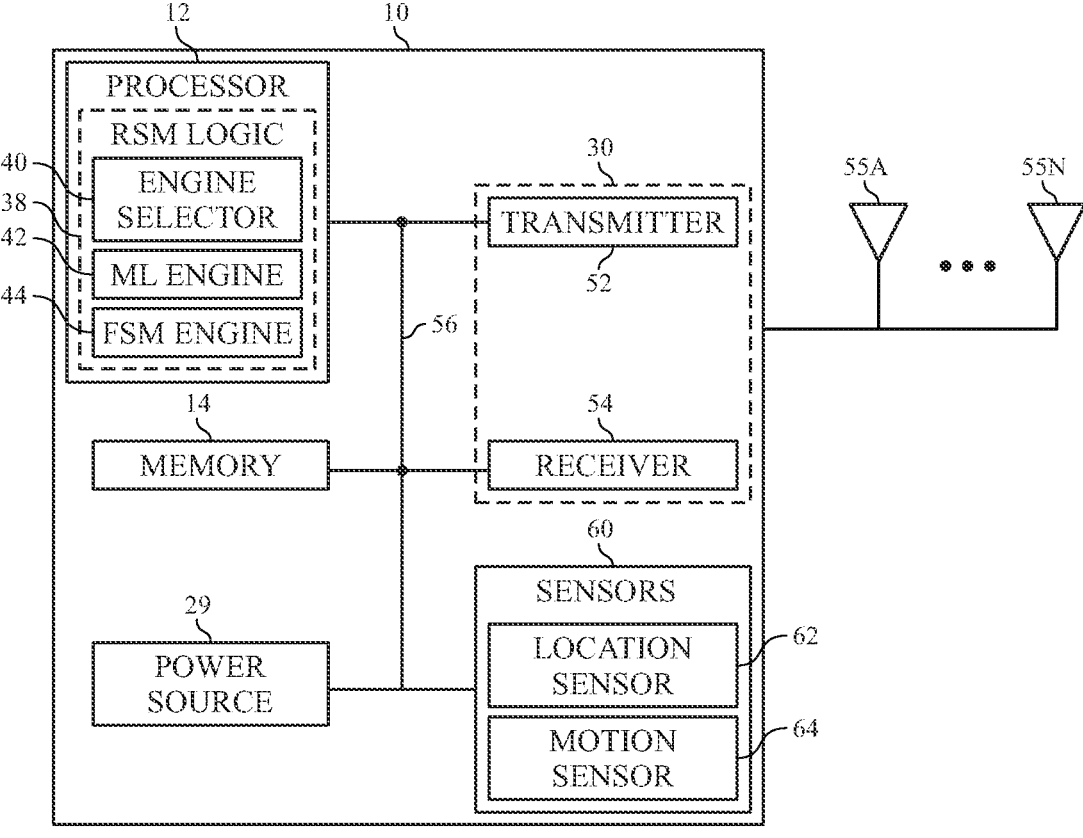
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the power source 29, the transceiver 30, the transmitter 52, the receiver 54, the antennas 55 (illustrated as 55A-55N, collectively the antenna 55) and/or sensors 60 may be communicatively coupled directly or indirectly (e.g., through or via another component, a communication bus, a network) to one another to transmit and/or receive data between one another.

The processor 12 may include resource and state management (RSM) logic 38 that manages resources and states of the electronic device 10. In particular, the RSM logic 38 may collect various system information or operating characteristics (e.g., power gating, clock gating, frequency that operations are performed, and so on) of the electronic device 10 and make real-time decisions to configure hardware resources of the electronic device 10 based on the collected system information or operating characteristics. As illustrated, the RSM logic 38 may include an engine selector 40, a machine learning (ML) engine 42, and a finite state machine (FSM) engine 44. While the RSM logic 38, the engine selector 40, the ML engine 42, and the FSM engine 44 may each be implemented in the processor 12 as illustrated in FIG. 2, in other embodiments, the RSM logic 38, the engine selector 40, the ML engine 42, and/or the FSM engine 44 may be implemented at least in part in other circuitry (e.g., other processing circuitry) or other hardware components that are separate from the processor 12. Moreover, the RSM logic 38, the engine selector 40, the ML engine 42, and/or the FSM engine 44 may be implemented at least in part as software, and, as such, may be stored on the memory 14, in the cloud, or as a software as a service (SAAS). Indeed, any or all of the RSM logic 38, the engine selector 40, the ML engine 42, and the FSM engine 44 may be implemented as logic, and thus may include hardware components (e.g., circuitry), software components (e.g., machine-executable instructions), or a combination of both. In some embodiments, the engine selector 40 may receive operating characteristics (e.g., system inputs) of the electronic device 10, and, based on the operating characteristics, the engine selector 40 may determine whether to execute the ML engine 42, the FSM engine 44, or both to configure hardware resources of the electronic device 10. The hardware resources of the electronic device 10 may include any of the components shown in FIGS. 1 and 2, as well as those further discussed herein.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/ or multiple antennas as suitable for various communication standards.

The transmitter 52 may wirelessly transmit packets having different packet types or functions. For example, the transmitter 52 may transmit packets of different types generated by the processor 12. The receiver 54 may wirelessly receive packets having different packet types. In some examples, the receiver 54 may detect a type of a packet used and process the packet accordingly. In some embodiments, the transmitter 52 and the receiver 54 may transmit and receive information via other wired or wireline systems or means.

The electronic device 10 may also include sensors 60. Non-limiting examples of the sensors 60 may include a location sensor 62 and a motion sensor 64. As discussed in detail below, data acquired from the sensors 60 may help the processor 12 determine operating characteristics of the electronic device 10. For example, the location sensor 62 may track a location of the electronic device 10 (e.g., in a building, urban environment, rural environment, a vehicle, a train, a car, an airplane, and so on). Based at least in part on the location of the electronic device 10, the processor 12 may determine whether to execute the ML engine 42, the FSM engine 44 or both. For example, the processor may execute the FSM engine 44 in response to determining the location of the electronic device 10 or determining that the electronic device 10 is traveling (e.g., electronic device 10 on a moving vehicle) and is associated with using the FSM engine 44. The FSM engine 44 may generate a decision to configure hardware resources of the electronic device 10 to enter a high performance state when the location of the electronic device is associated with good signal quality (e.g., to take advantage of the good signal quality in an urban environment), without changing the performance state based on fluctuating signal quality. On the other hand, the FSM engine 44 may generate a decision to configure hardware resources of the electronic device 10 to enter a low performance state when the location of the electronic device is associated with poor signal quality (e.g., to prevent wasting resources when operating with poor signal quality in a rural environment), again without changing the performance state based on fluctuating signal quality. It should be understood that good and poor signal qualities may be measured using any suitable standard, and good signal quality refers to a signal to noise ratio over a threshold value, a signal power over a threshold value, dropped packets being less than a threshold value, and so on, while poor signal quality refers to a signal to noise ratio less than a threshold value, a signal power less than a threshold value, dropped packets being greater than a threshold value, and so on. In this manner, power and/or other resources may be conserved, instead of wasted on reconfiguring hardware resources over and over due to fluctuating signal quality.

In some embodiments, the processor 12 may execute the ML engine 42 in response to being unable to determine a location of the electronic device 10 or determining that the electronic device 10 is traveling and not associated with using the FSM engine 44. The ML engine 42 may generate a decision to configure the hardware resources to frequently switch between a high performance state and a low performance state as signal quality changes. Moreover, the motion sensor 64 may track movement indicative of walking, running, sleeping, and swimming of a user holding or carrying the electronic device 10. Similar to location of the electronic device 10 or determining that the electronic device 10 is traveling, actions of the user may also be operating characteristics that help the processor 12 determine how to configure the hardware resources of the electronic device 10.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

The operating characteristics of the electronic device 10 may include any suitable characteristic, parameter, measured value, and so on, of the electronic device 10, for which it may be desired for the processor 12 (e.g., using the RSM logic 38) to manage resources and/or states of the electronic device 10. For example, the operating characteristics may include a location of the electronic device 10, an indication of whether the electronic device 10 is traveling, an indication of actions of associated with a user of the electronic device 10 (e.g., sleeping, swimming, running, walking), time-critical service(s) of the electronic device 10, power state(s) of the electronic device 10, performance state(s) of the electronic device 10, network condition(s) of the electronic device 10, frequency of hardware components within the electronic device 10, and so forth. The operating characteristics may also include statistics related to cellular operation.

As an illustrative example, FIG. 3 is a table of example operating characteristics 100 (e.g., system inputs, runtime statistics) of the electronic device 10 related to cellular operation, according to embodiments of the present disclosure. As discussed in detail below, the processor 12 (e.g., using the engine selector 40) may evaluate the operating characteristics 100, including those listed in the table of FIG. 3, to determine whether to execute the ML engine 42, the FSM engine 44, or both to configure the hardware resources of the electronic device 10. Further, the operating characteristics 100 may serve as inputs for executing the ML engine 42, the FSM engine 44, or both.

As illustrated, non-limiting examples of the operating characteristics 100 related to cellular operation may include an L3 frequency band (e.g., centered at 1381.05 megahertz (MHz)) throughput uplink (UL) 102, L3 throughput downlink (DL) 104, an L2 frequency band (e.g., centered at 1227.60 MHz) throughput uplink (UL) 106, L2 throughput downlink (DL) 108, container occupation uplink (UL) 110, container occupation downlink (DL) 112, active transfer ring number (TR NUM) 114, active completion ring number (CR NUM) 116, active cell group 117, uplink data radio bearer (UL DRB) pipe size 118, uplink signal radio bearer (UL SRB) pipe size 120, downlink transmission block (DL TB) size 122, downlink transmission block service data unit number (DL TB SDU NUM) 124, downlink (DL) fragment number 126, uplink grant size 128, and logical channel prioritization (LCP) pipe size 130.

The electronic device 10 may be a cellular device that includes a modem with varying layers (e.g., network layer, medium access control (MAC) layer). Accordingly, the L3 throughput uplink (UL) 102 may refer to a rate of transmitting a signal from the network layer of the cellular device to a cell tower over the L3 band, and the L3 throughput downlink (DL) 104 may refer to a rate of receiving a cell signal from a cell tower via the network layer of the cellular device over the L3 band. Further, the L2 throughput uplink (UL) 106 may refer to a rate of transmitting a signal from the medium access control (MAC) layer of the cellular device to a cell tower over the L2 band, and the L2 throughput downlink (DL) 108 may refer to a rate of receiving a cell signal from a cell tower via the medium access control (MAC) layer of the cellular device over the L2 band.

The uplink data radio bearer (UL DRB) pipe size 118 may refer to the size of channels for transferring user or control data from L2 (e.g., medium access control (MAC) layer) to higher layers of the modem (e.g., L3, network layer). The uplink signal radio bearer (UL SRB) pipe size 120 may refer to the size of channel for transferring radio resource control (RRC) and/or non-access stratum (NAS) messages. The downlink transmission block (DL TB) size 122 refer to bandwidth of a block of the cellular device for receiving data from a cell tower. The downlink (DL) fragment number 126 may refer to the number of information frames received by the cellular device from a cell tower. The uplink grant size 128 may indicate an amount of data transmitted the cellular device to a cell tower. Moreover, the logical channel prioritization (LCP) pipe size 130 may refer to a priority or importance of each logic channel of the cellular device such that data may be transmitted in order of increasing priority.

Figure 4:
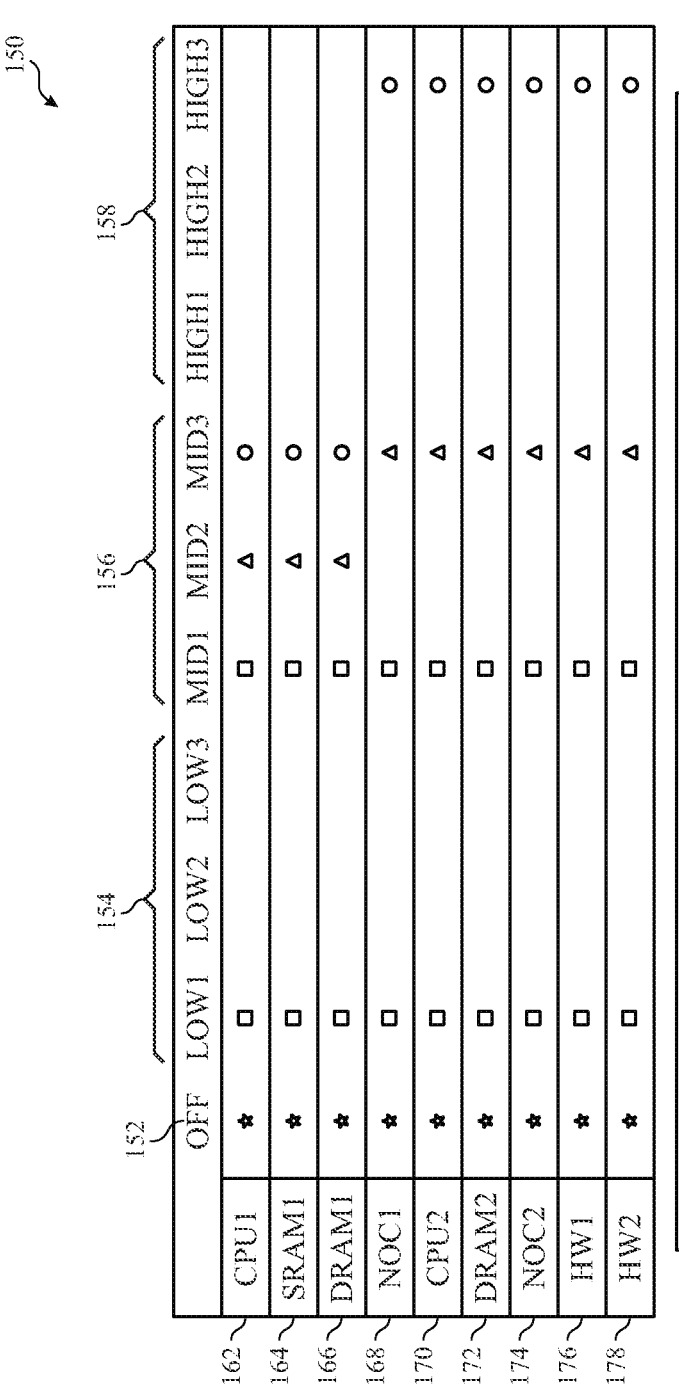
FIG. 4 is a table of operating characteristics of the electronic device of FIG. 1 and power states that hardware resources of the electronic device of FIG. 1 may enter based on the operating characteristics, according to embodiments of the present disclosure.

The operating characteristics of the electronic device 10 may also include a direction of communication (e.g., downloading, uploading), a signal quality, a data rate, a type of communication (e.g., voice calling, video streaming), and so on. As discussed in detail below, the processor 12 (e.g., using the engine selector 40) may evaluate the operating characteristics to determine whether to execute the ML engine 42, the FSM engine 44, or both, and configure the hardware resources of the electronic device 10 according to an ML decision, an FSM decision, or both. In particular, the processor 12 (e.g., using the RSM logic 38) may cause the hardware resources to enter a determined power state. As illustrative example, FIG. 4 is a table of operating characteristics of the electronic device 10 and power states 150 that hardware resources of the electronic device 10 may enter based on the operating characteristics, according to embodiments of the present disclosure. The hardware resources may include any circuitry, components, and the like, of the electronic device 10. Non-limiting examples of the hardware resources include a first central processing unit (CPU1) 162, a first static random-access memory (SRAM1) 164, a first dynamic random-access memory (DRAM1) 166, a first network on chip (NOC1) 168, a second central processing unit (CPU2) 170, a second dynamic random-access memory (DRAM2) 172, a second network on chip (NOC2) 174, a first hardware component (HW1) 176, and a second hardware component (HW2) 178. The hardware resources may operate in different power states (e.g., an off state 152, a low power state 154, a middle power state 156, and a high power state 158) based on various operating characteristics (e.g., downloading at a high data rate, downloading a low data rate, voice calling, airplane mode). In some embodiments, each power state may also be associated with a priority value, including priority 1, priority 2, or priority 3 (e.g., Low1, Low2, Low3, Mid1, Mid2, Mid3, High1, High2, High3). The priority of the power state may increase in descending order of the priority value.

For example, when the electronic device 10 is in an airplane mode or a deep sleep state (as illustrated by the star symbol), the processor 12 may configure each of the hardware resources 162-178 to a power off state 152 to save power based on a decision from the ML engine 42, the FSM engine 44, or both. As another example, when the electronic device 10 is being used for voice calling or is in a light sleep state, the processor 12 may configure each of the hardware resources 162-178 to switch from the low power state 154 to the mid power state 156 based on a decision from the ML engine 42, the FSM engine 44, or both.

Further, as illustrated by the power states 150 of FIG. 4, when the user is downloading files at a low data rate or in a location with poor signal quality (as illustrated by the triangle symbol), the processor 12 may configure the first central processing unit (CPU1) 162, the first static random-access memory (SRAM1) 164, and the first dynamic random-access memory (DRAM1) 166 in the mid power state 156 with a level 2 priority based on a decision from the ML engine 42, the FSM engine 44, or both. In this case, the processor 12 may configure the first network on chip (NOC1) 168, the second central processing unit (CPU2) 170, the second dynamic random-access memory (DRAM2) 172, the second network on chip (NOC2) 174, the first hardware component (HW1) 176, and the second hardware component (HW2) 178 to operate in the mid power state 156 with a level 3 priority that is different from the level 2 priority based on a decision from the ML engine 42, the FSM engine 44, or both.

When the user is downloading files at a high data rate or in a location with poor signal quality, the processor 12 may configure the first central processing unit (CPU1) 162, the first static random-access memory (SRAM1) 164, the first dynamic random-access memory (DRAM1) 166 in the mid power state 156 with a level 3 priority based on a decision from the ML engine 42, the FSM engine 44, or both. In this case, the processor 12 may configure the first network on chip (NOC1) 168, the second central processing unit (CPU2) 170, the second dynamic random-access memory (DRAM2) 172, the second network on chip (NOC2) 174, the first hardware component (HW1) 176, and the second hardware component (HW2) 178 to operate in the high power state 158 with a level 3 priority based on a decision from the ML engine 42, the FSM engine 44, or both. It should be understood that the operating characteristics and/or the power states shown in FIGS. 3 and 4 are non-limiting examples, and there may be more or less operating characteristics and/or power states than those provided in FIGS. 3 and 4.

Figure 5:
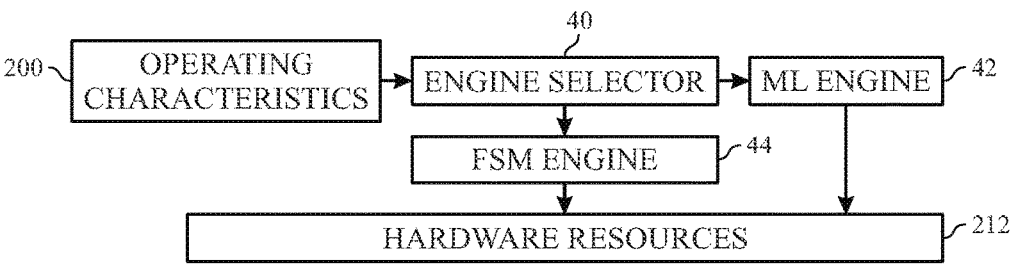
FIG. 5 is a block diagram of resource and state management logic of the electronic device of FIG. 1 that weighs decisions made by a machine learning engine and a finite state machine engine equally, according to embodiments of the present disclosure.

The following figures illustrate how the engine selector 40 of the processor 12 determines whether to execute the ML engine 42, the FSM engine 44, or both to configure hardware resources of the electronic device 10 (e.g., as described in the examples shown in the table of FIG. 4). Accordingly, FIG. 5 is a block diagram of the RSM logic 38 of the electronic device 10 that weighs decisions made by the ML engine 42 and the FSM engine 44 equally, according to embodiments of the present disclosure. The engine selector 40 of the RSM logic 38 may receive operating characteristics 200 of the electronic device 10 (e.g., including the operating characteristics described above, such as the operating characteristics 100 of FIG. 3, the operating characteristics shown in FIG. 4, or any other suitable characteristic, parameter, measured value, and so on, of the electronic device 10, for which it may be desired for the RSM logic 38 to manage resources and/or states of the electronic device 10). In some embodiments, the engine selector 40 may determine the operating characteristics 200 based on receiving sensor information (e.g., an indication of a location of the electronic device 10, an indication that the electronic device 10 is traveling, an indication that the user is performing an action such as walking or sleeping) from the sensors 60. Based on the operating characteristics 200, the engine selector 40 may determine whether to execute the ML engine 42 or the FSM engine 44. If the engine selector 40 determines that the operating characteristics 200 are associated with using the ML engine 42, then the engine selector 40 may execute the ML engine 42 to generate a ML decision.

The operating characteristics 200 may serve as inputs to the ML engine 42. Further, the ML decision may serve as an input to configure hardware resources 212 of the electronic device 10.

As used herein, machine learning may refer to algorithms and statistical models that computer systems (e.g., including the electronic device 10) use to perform a specific task with or without using explicit instructions. For example, a machine learning process may generate a mathematical model based on a sample of data, known as "training data," in order to make predictions or decisions without being explicitly programmed to perform the task.

Depending on the inferences to be made, the ML engine 42 may implement different forms of machine learning. For example, in some embodiments (e.g., when particular known examples exist that correlate to future predictions or estimates that the ML engine 42 may be tasked with generating), the ML engine 42 may implement supervised machine learning. In supervised machine learning, a mathematical model of a set of data contains both inputs and desired outputs. This data is referred to as "training data" and may include a set of training examples. Each training example may have one or more inputs and a desired output, also known as a supervisory signal. In a mathematical model, each training example is represented by an array or vector, sometimes called a feature vector, and the training data is represented by a matrix. Through iterative optimization of an objective function, supervised learning algorithms may learn a function that may be used to predict an output associated with new inputs. An optimal function may allow the algorithm to correctly determine the output for inputs that were not a part of the training data. An algorithm that improves the accuracy of its outputs or predictions over time is said to have learned to perform that task.

Supervised learning algorithms may include classification and regression techniques. Classification algorithms may be used when the outputs are restricted to a limited set of values, and regression algorithms may be used when the outputs have a numerical value within a range. Similarity learning is an area of supervised machine learning closely related to regression and classification, but the goal is to learn from examples using a similarity function that measures how similar or related two objects are. Similarity learning has applications in ranking, recommendation systems, visual identity tracking, face verification, and speaker verification.

Additionally and/or alternatively, in some situations, it may be beneficial for the ML engine 42 to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data.

That is, the ML engine 42 may implement cluster analysis, which is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. In additional or alternative embodiments, the ML engine 42 may implement other machine learning techniques, such as those based on estimated density and graph connectivity.

In contrast, if the engine selector 40 determines that the operating characteristics 200 are associated with using the FSM engine 44, then the engine selector 40 may execute the FSM engine 44 to generate an FSM decision. The operating characteristics 200 may serve as inputs for executing the FSM engine 44. Further, the FSM decision may serve as an input to configure the hardware resources 212. As used herein, the FSM engine 44 may perform state transitions and produce outputs based on a current state and one or more given inputs.

Figure 6:
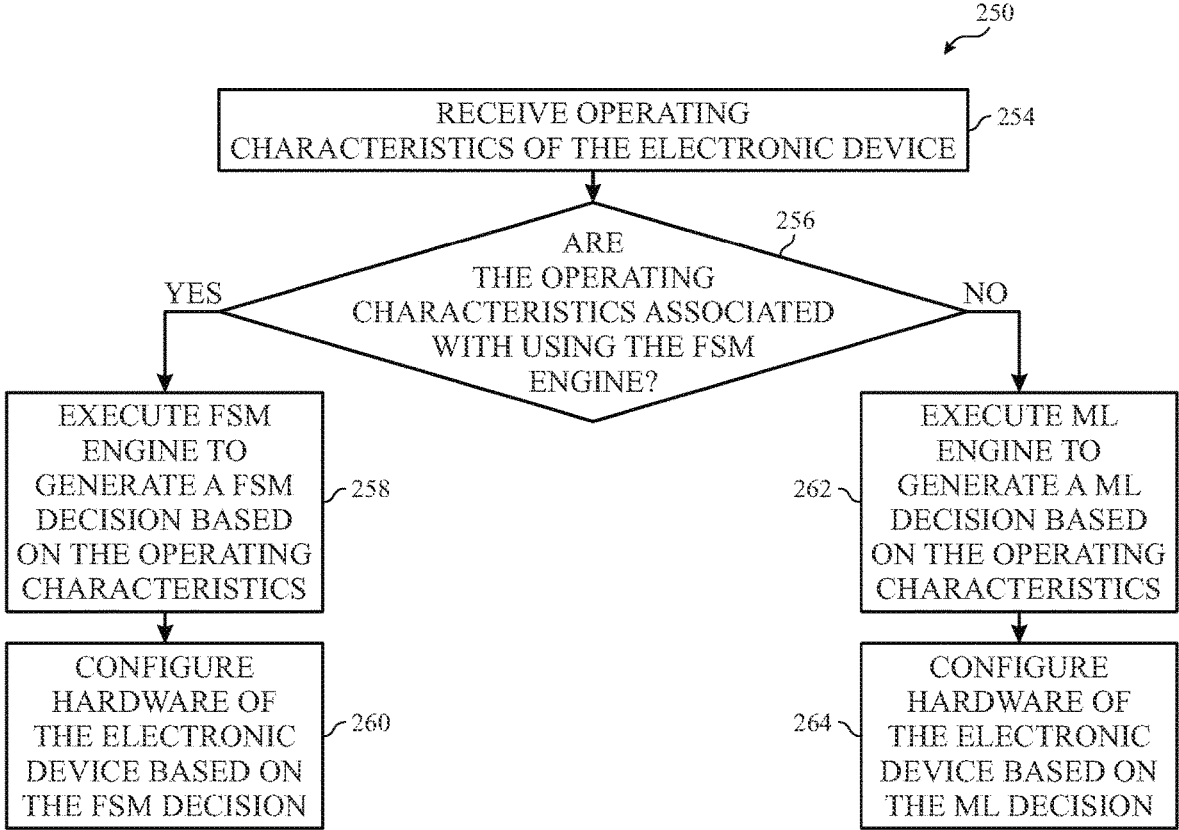
FIG. 6 is a flow chart of a process for configuring hardware resources of the electronic device of FIG. 1 that equally weighs decisions made by a machine learning engine and a finite state machine engine, according to embodiments of the present disclosure.

FIG. 6 is a flow chart of a process 250 for configuring the hardware resources 212 of the electronic device 10 that equally weighs decisions made by the ML engine 42 and the FSM engine 44, according to embodiments of the present disclosure. Any suitable device (e.g., a controller) that may control components of the electronic device 10, such as the processor 12, the RSM logic 38, and/or the engine selector 40, may perform the process 250. In some embodiments, the process 250 may be implemented by executing instructions stored in a non-transitory, computer-readable medium, such as the memory 14 or storage 16, using the processor 12. For example, the process 250 may be performed at least in part by one or more software components, such as an operating system of the electronic device 10, one or more software applications of the electronic device 10, and the like. While the process 250 is described using steps in a specific sequence, it should be understood that the present disclosure contemplates that the described steps may be performed in different sequences than the sequence illustrated, and certain described steps may be skipped or not performed altogether.

In process block 254, the processor 12 receives the operating characteristics 200 of the electronic device 10. For example, a user may download files to the electronic device 10 with dynamic signal quality, where the signal changes frequently from good quality to poor quality (e.g., due to being in an office complex, in a train, and so on). As such, the operating characteristics 200 may include a frequency of switching between the low performance state and the high performance state, a location of the electronic device 10, an indication that the electronic device 10 is traveling, a load associated with downloading files, a frequency of downloading files, and so forth.

In process block 256, the processor 12 determines whether the operating characteristics 200 are associated with using the FSM engine 44. For example, the processor 12 may determine that the location of the electronic device 10 (e.g., the office complex) is associated with using the FSM engine 44. As another example, the processor 12 may determine that the electronic device 10 traveling is associated with using the FSM engine 44.

In process block 258, the processor 12 executes the FSM engine 44 if the operating characteristics 200 are associated with using the FSM engine 44. Upon execution, the FSM engine 44 generates an FSM decision based on the operating characteristics 200. At process block 260, the processor 12 configures the hardware resources 212 of the electronic device 10 based on the FSM decision. That is, the processor 12 causes the hardware resources 212 to enter a particular performance state (e.g., a high performance state, middle performance state, a low performance state, such as those shown in FIG. 4) based on the FSM decision. Using the previous example, the processor may execute the FSM engine 44 in response to determining the location of the electronic device 10 (e.g., the office complex) or determining that the electronic device 10 traveling (e.g., on a moving train) is associated with using the FSM engine 44. For example, the FSM engine 44 may generate the FSM decision to configure hardware resources 212 of the electronic device 10 to enter a high performance state when the location of the electronic device 10 is associated with good signal quality (e.g., to take advantage of the good signal quality of the office complex).

In some embodiments, the FSM engine 44 may generate the FSM decision to configure hardware resources 212 of the electronic device 10 to enter a low performance state when the location of the electronic device 10 is associated with poor signal quality (e.g., to prevent wasting resources when operating with poor signal quality on a moving train). By configuring the hardware resources 212 based on the finite state machine (FSM) decision when the operating characteristics 200 are associated with using the FSM engine 44, the processor 12 prevents frequent switching of the hardware resources 212 between performance states, and thereby reducing energy consumption.

However, at process block 262, if the operating characteristics 200 are not associated with using the FSM engine 44, then the processor 12 executes the ML engine 42. Upon execution, the ML engine 42 generates an ML decision. At process block 264, the processor 12 configures the hardware resources 212 based on the ML decision. Using the example above, if the processor 12 is unable to identify a location of the electronic device 10 or unable to determine that the electronic device 10 is traveling, then the processor 12 executes the ML engine 42. The ML engine 42 may generate the ML decision to configure the hardware resources 212 to enter a high performance state when the signal quality is good, and a low performance state when the signal quality is poor. That is, because a location or indication of traveling is not known to inform the FSM engine 44 as to the quality of communication signals, the ML engine 42 may simply configure the hardware resources according to signal quality.

In some embodiments, because it may be burdensome and power intensive for the FSM engine 44 to generate the FSM decision based on each operating characteristic 200, the processor 12 may execute the FSM engine 44 based on a portion of the operating characteristics 200. Further, in cases when the processor 12 configures the hardware resources 212 based on the FSM decision rather than the ML decision, the ML engine 42 may be re-trained or ML training parameters may be updated based on the operating characteristics 200 that caused the processor 12 to execute the of the FSM engine 44. In some embodiments, the hardware resources 212 may be in the process of being configured according to a ML decision. However, the processor 12 may receive operating characteristics 200 and the change in operating state 202 that are associated with using the FSM engine 44 instead. In this case, the processor 12 may discontinue or disable executing the ML engine 42 and configuring the hardware resources 212 according to the ML decision. Instead, the processor 12 may immediately execute the FSM engine 44 and configure the hardware resources 212 according to the FSM. In this manner, the processor 12 may optimize efficiency of the electronic device 10 by preventing the ML engine 42 from controlling the configuration of the hardware resources 212 that have operating characteristics 200 associated with the FSM engine 44.

Figure 7:
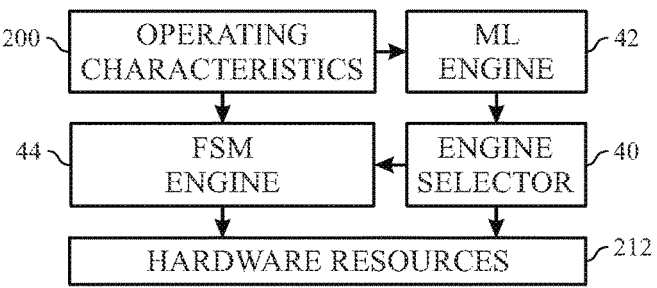
FIG. 7 is a block diagram of resource and state management logic of the electronic device of FIG. 1 that gives greater weight to decisions made by a machine learning engine compared to decisions made by a finite state machine engine, according to embodiments of the present disclosure.

In additional and/or alternative embodiments, the processor 12 may execute the ML engine 42 by default to generate a ML decision to configure the hardware resources 212. However, if the ML decision and the operating characteristics 200 are associated with using the FSM engine 44, then the processor may configure the hardware resources 212 based on the FSM decision rather than the ML decision. FIG. 7 is a block diagram of the RSM logic 38 of the electronic device 10 that gives greater weight to decisions made by the ML engine 42 compared to decisions made by the FSM engine 44, according to embodiments of the present disclosure.

As illustrated, the ML engine 42 may receive the operating characteristics 200 of the electronic device 10. The processor 12 may execute the ML engine 42 based on the operating characteristics 200. As mentioned above, the operating characteristics 200 of the electronic device 10 may include any suitable characteristic, parameter, measured value, and so on, of the electronic device 10, for which it may be desired for the processor 12 (e.g., using the RSM logic 38) to manage resources and/or states of the electronic device 10. For example, the operating characteristics 200 may include runtime statistics of the electronic device 10 related to hardware states, software states, a location of the electronic device 10, a location of a user of the electronic device 10, an indication of actions of the user, network conditions, power parameters, and so forth. The operating characteristics 200 related to the hardware states may include power gating, clock gating, retention time, non-retention, frequency, load, performance mode, power saving, and the like of the hardware resources 212. Power gating may refer to providing power to hardware resources 212 that are in use by the electronic device 10 while turning off power for the hardware resources 212 that are not in use by the electronic device 10. Similarly, clock gating may refer to providing a clock signal to hardware resources 212 that are in use by the electronic device 10 while removing the clock signal from the hardware resources 212 that are not in use by the electronic device 10. Retention time may refer to an amount of time that a memory cell of the electronic device 10 can safely retain data without being refreshed. For example, because dynamic random-access memory (DRAM) constantly refreshes data, the dynamic random-access memory (DRAM) may have a retention time. In contrast, static random-access memory (SRAM) may not constantly refresh data, and thus static random-access memory (SRAM) may be associated with non-retention properties.

Different hardware resources 212 may operate at varying levels (e.g., low, middle, high) of frequency, load, and performance states based on the operating characteristics 200 of the electronic device 10. Further, the operating characteristics 200 related to the hardware states may include how frequently the hardware resources 212 change states (e.g., changing from low performance mode to high performance mode) based on a decision from the ML engine 42. Additionally, non-limiting examples of the operating characteristics 200 related to the software states may include whether an application is running in the background of the electronic device 10 (e.g., such that the application is not the focus of the display 18 as viewable by a user), the application is being actively used by the electronic device 10 (e.g., such that the application is the focus of the display 18 as viewable by a user), or the application is not in use by the electronic device 10. For example, if the application is running in the background of the electronic device 10, the processor may execute the ML engine 42 to generate a ML decision that configures at least some of the hardware resources 212 to be in a deep sleep state. The electronic device 10 consumes less power when operating in a deep sleep state compared to a light sleep state. Thus, when the electronic device 10 is not actively using the application is, the processor may execute the ML engine 42 to generate the ML decision that configures at least some of the hardware resources 212 to enter the deep sleep state. By entering the deep sleep state, the electronic device 10 may reduce processing power.

The location of the electronic device 10 (e.g., indoors, outdoors, in an office building, in a train, in a car, in an airplane) may also impact whether the processor 12 executes the ML engine 42, the FSM engine 44, or both to configures the hardware resources 212. For example, if the electronic device 10 is in a location with or associated with poor signal quality (e.g., in a rural environment), then the processor 12 may execute the ML engine 42, FSM engine 44, or both to generate a decision that configures the hardware resources 212 to enter a low performance state. However, if the electronic device 10 is in a location with or associated with good signal quality (e.g., in an urban environment), then the processor 12 may execute the ML engine 42, FSM engine 44, or both to generate a decision that configures the hardware resources 212 to enter a high performance state.

Further, actions of the user may also impact whether the processor 12 executes the ML engine 42, the FSM engine 44, or both to configure the hardware resources 212. Actions of the user may include whether the user is walking, running, sleeping, swimming, carrying the electronic device 10, actively using the electronic device 10, and the like. If the processor 12 determines that the user is sleeping and not actively using the electronic device 10, the processor 12 may execute the ML engine 42 to generate a decision that configures the hardware resources 212 to enter a deep sleep state, for example. If the processor 12 determines that the user is actively using the electronic device 10, the processor 12 may execute the FSM engine 44 to generate a decision that configures the hardware resources 212 to enter a light sleep state. The processor 12 may receive the location of the user, the location of the electronic device 10, and the actions of the user from the sensors 60. For example, the location sensor 62 may determine the location of the user and/or the electronic device 10. The motion sensor 64 may track movement indicative walking, running, sleeping, swimming, and so forth of a user holding or carrying the electronic device 10.

Non-limiting examples of network conditions of the hardware resources 212 may include bit error rate, packet error rate, and channel quality report. Further, the network conditions of wireless transmission may be related to new radio (NR) (e.g., NR frequency 1, NR frequency 2), long term evolution (LTE), or both new radio (NR) and long term evolution (LTE). Operating characteristics 200 related to power saving may include a maximum performance of the electronic device 10, a maximum lifetime of the electronic device 10, connection of the electronic device 10 to an external power source, and so forth. It can be appreciated that operating characteristics 200 may be predetermined of dynamically updated. The operating characteristics 200 may be stored in a look-up table, for example.

Referring back to the block diagram of FIG. 7, upon execution, the ML engine 42 may generate a ML decision based on the operating characteristics 200. The engine selector 40 may receive the ML decision and determine whether the ML decision and the operating characteristics 200 are associated with using the FSM engine 44. If the engine selector 40 determines that the operating characteristics 200 are not associated with using the FSM engine 44, then the engine selector 40 may configure the hardware resources 212 based on the ML decision.

However, if the engine selector 40 determines that the operating characteristics 200 are associated with using the FSM engine 44, then the engine selector 40 may execute the FSM engine 44. The operating characteristics 200 may serve as inputs for executing the FSM engine 44. Upon execution, the FSM engine 44 may generate a FSM decision. Rather than using the machine learning (ML) decision, the processor 12 may configure the hardware resources 212 based on the finite state machine (FSM) decision.

Figure 8:
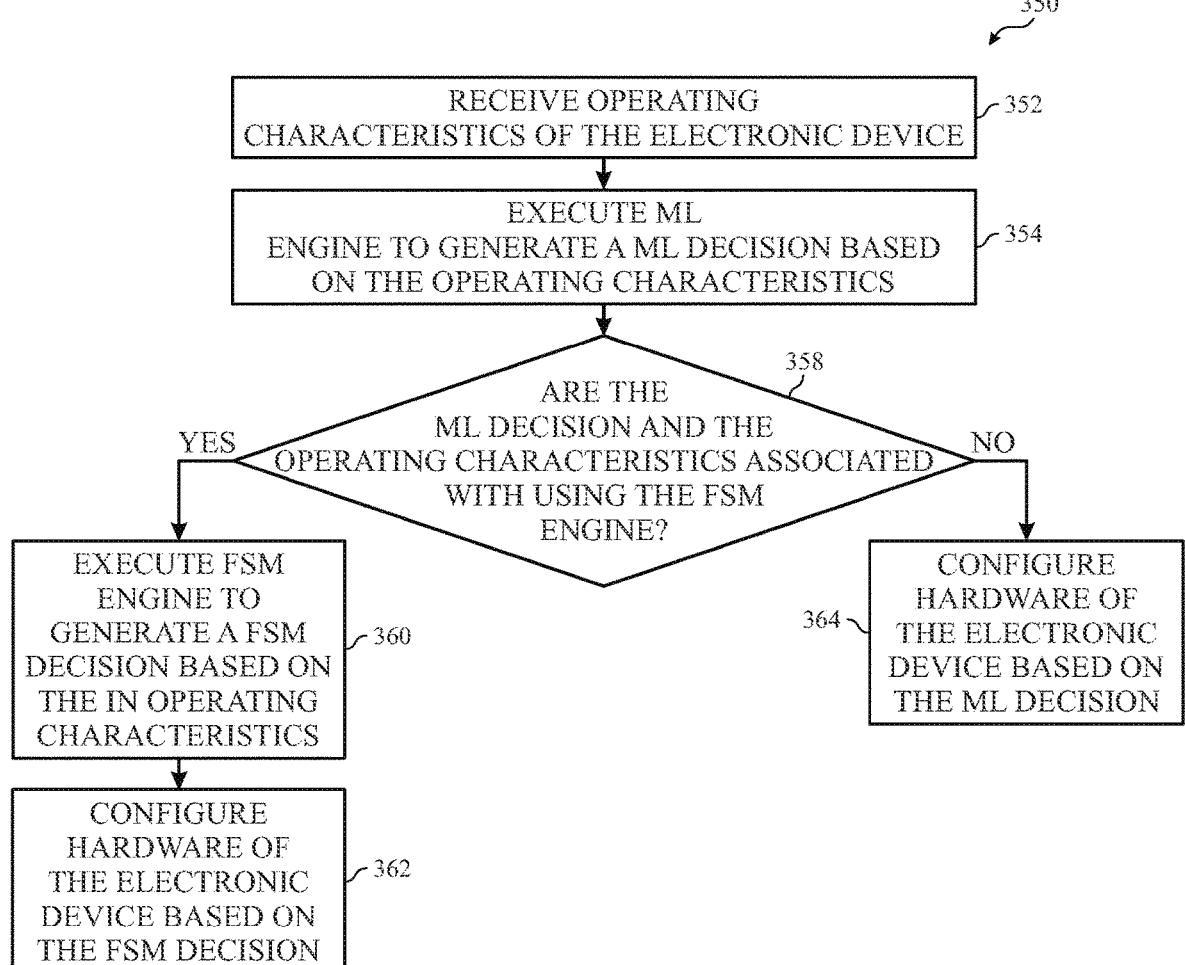
FIG. 8 is a flow chart of a process for configuring hardware resources of the electronic device of FIG. 1 that gives greater weight to decisions made by a machine learning engine compared to decisions made by a finite state machine engine, according to embodiments of the present disclosure.

FIG. 8 is a flow chart of a process 350 for configuring hardware resources 212 of the electronic device 10 that gives greater weight to decisions made by the ML engine 42 compared to decisions made by the FSM engine 44, according to embodiments of the present disclosure. Any suitable device (e.g., a controller) that may control components of the electronic device 10, such as the processor 12, the RSM logic 38, and/or the engine selector 40, may perform the process 350. In some embodiments, the process 350 may be implemented by executing instructions stored in a non-transitory, computer-readable medium, such as the memory 14 or storage 16, using the processor 12. For example, the process 350 may be performed at least in part by one or more software components, such as an operating system of the electronic device 10, one or more software applications of the electronic device 10, and the like. While the process 350 is described using steps in a specific sequence, it should be understood that the present disclosure contemplates that the described steps may be performed in different sequences than the sequence illustrated, and certain described steps may be skipped or not performed altogether.

In process block 352, the processor 12 receives operating characteristics 200 of the electronic device 10. For example, the operating characteristics 200 may include an indication of a traffic state of the electronic device 10. The traffic state (e.g. low traffic state, middle traffic state, high traffic state) of the electronic device 10 indicate may indicate the number of applications or operations being performed by the electronic device 10. The number of application or operations being performed by the electronic device 10 decrease with a lower traffic state. In some cases, the processor 12 may use less computational power in a lower traffic state.

In process block 354, the processor 12 executes the ML engine 42 to generate a machine learning (ML) decision based on the operating characteristics 200. Given the above example, in response to determining that the electronic device 10 is associated with a low traffic state (e.g., only executing applications or tasks in the background of the electronic device 10, such that the applications or tasks are not the focus of the display 18 as viewable by a user), the processor executes the ML engine 42 to generate a ML decision that configures the hardware resources 212 to enter a deep sleep state. The electronic device 10 consumes less power when operating in a deep sleep state compared to a light sleep state. Thus, when the electronic device 10 is not actively using applications (e.g., such that the applications are the focus of the display 18 as viewable by a user), the processor may execute the ML engine 42 to generate the ML decision that configures at least some of the hardware resources 212 to enter the deep sleep state. By entering deep sleep state, the electronic device 10 may reduce use of processing power.

In process block 358, the processor 12 determines whether the ML decision and the operating characteristics 200 are associated with using the FSM engine 44. Using the previous example, the processor may determine that the low traffic state is caused by a time-critical service and is associated with using the FSM engine 44. As used herein, a time-critical service (e.g., online gaming, an emergency service, and so on) indicates use of the electronic device 10 where a time of response (e.g., due to a user action) may be desired or a priority to a user.

In process bock 360, the processor 12 executes the FSM engine 44 to generate a FSM decision based on the operating characteristics 200 in response to determining the ML decision and the operating characteristics 200 are indeed associated with using the FSM engine 44. In process block 362, the processor 12 configures the hardware resources 212 of the electronic device 10 based on the FSM decision. Based on the above example, in response to determining that the low traffic state is associated with the time-critical services, the processor executes the FSM engine 44 to generate the FSM decision that configures the hardware resources 212 to enter a light sleep state to account for the increase in processing power for the time-critical service.

However, in process block 364, the processor 12 configures the hardware resources 212 of the electronic device 10 based on the ML decision in response to determining the ML decision and the operating characteristics 200 are not associated with using the FSM engine 44. In the above example, if the processor 12 determines that the low traffic state is generated by applications running in the background without any time-critical services (e.g., low traffic state associated with using the FSM engine 44), then the processor 12 configures the hardware resources 212 based on the ML decision. Based on the ML decision, the processor 12 hardware resources 212 to enter the deep sleep state, and thereby reducing use of processing power and system resources. In this manner, the processor 12 is able to determine a suitable configuration for the hardware resources 212 that increase or optimizes power and efficiency for the electronic device 10.

Figure 9:
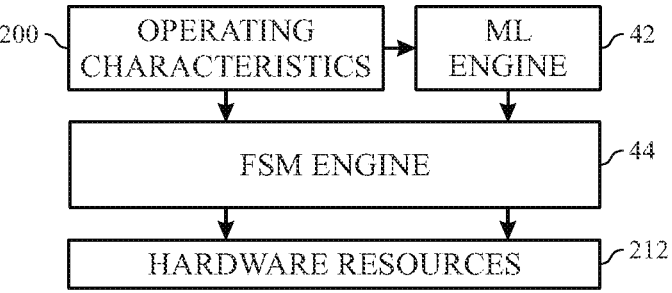
FIG. 9 is a block diagram of resource and state management logic of the electronic device of FIG. 1 that gives greater weight to decisions made by a finite state machine engine compared to decisions made by a machine learning engine, according to embodiments of the present disclosure.

In additional embodiments, the processor 12 may execute the FSM engine 44 using the operating characteristics 200 and the ML decision as inputs to generate the FSM decision, and the processor 12 may configure the hardware resources 212 based on the FSM decision. FIG. 9 is a block diagram of the RSM logic 38 of the electronic device 10 that gives greater weight to decisions made by the FSM engine 44 compared to decisions made by the ML engine 42, according to embodiments of the present disclosure.

As illustrated, the ML engine 42 may receive the operating characteristics 200 as inputs. The processor 12 may execute the ML engine 42 based on the operating characteristics 200 serving as input. Using the ML decision and the operating characteristics 200 of the electronic device 10 as inputs, the processor 12 may execute the FSM engine 44. Upon execution, the FSM engine 44 may generate a FSM decision based on the ML decision and the operating characteristics 200 serving as inputs for the FSM engine 44. The processor may configure the hardware resources 212 based on the FSM decision.

Figure 10:
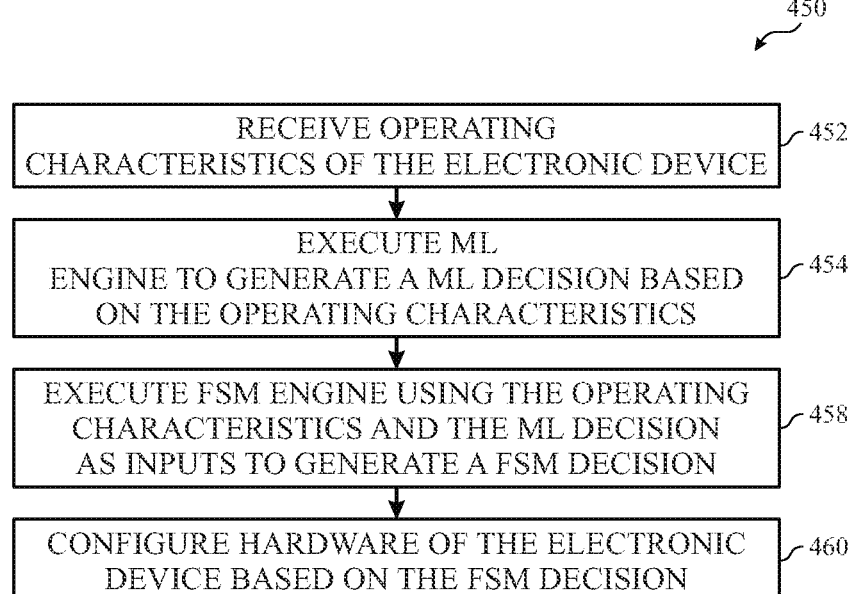
FIG. 10 is a flow chart of a process for configuring hardware resources of the electronic device of FIG. 1 that gives greater weight to decisions made by a finite state machine engine compared to decisions made by a machine learning engine, according to embodiments of the present disclosure.

FIG. 10 is a flow chart of a process 450 for configuring hardware resources 212 of the electronic device 10 that gives greater weight to decisions made by the FSM engine 44 compared to decisions made by the ML engine 42, according to embodiments of the present disclosure. Any suitable device (e.g., a controller) that may control components of the electronic device 10, such as the processor 12 and/or the RSM logic 38, may perform the process 450. In some embodiments, the process 450 may be implemented by executing instructions stored in a non-transitory, computer-readable medium, such as the memory 14 or storage 16, using the processor 12. For example, the process 450 may be performed at least in part by one or more software components, such as an operating system of the electronic device 10, one or more software applications of the electronic device 10, and the like. While the process 450 is described using steps in a specific sequence, it should be understood that the present disclosure contemplates that the described steps may be performed in different sequences than the sequence illustrated, and certain described steps may be skipped or not performed altogether.

In process block 452, the processor 12 receives operating characteristics 200 of the electronic device 10. For example, the operating characteristics 200 may include an indication of the electronic device 10 performing real-time or time-critical services (e.g., associated with active use of the electronic device 10). Real-time or time-critical services may be defined as any computationally intensive tasks, tasks associated with prompt response times, or both. Such services may include encryption/decryption, floating point operations, gene sequencing, image processing, high volume data operations, complex calculations, artificial intelligence, online gaming, modeling, and so on.

In process block 454, the processor 12 executes the ML engine 42 to generate a ML decision based on the operating characteristics 200. For example, in response to determining that the hardware resources 212 of the electronic device 10 are not performing real-time, performing time-critical services, being actively used, and so on, the processor 12 executes the ML engine 42 to generate a ML decision to configure at least some of the hardware resources 212 in a deep sleep state. The electronic device 10 consumes less power when operating in a deep sleep state compared to a light sleep state. Thus, when the electronic device 10 is not actively using the hardware resources 212, for example, the processor may execute the ML engine 42 to generate the ML decision that configures at least some of the hardware resources 212 to enter the deep sleep state. By entering the deep sleep state, the electronic device 10 may reduce use of processing power.

In process block 458, the processor 12 executes the FSM engine 44 using the operating characteristics 200 and the ML decision as inputs to generate a FSM decision. In process block 460, the processor 12 configures hardware resources 212 of the electronic device 10 based on the finite state machine (FSM) decision. As an example, the finite state machine (FSM) decision may include two outputs: a state that allows deep sleep and a state that does not allow deep sleep. If the hardware resources 212 are not operating any real-time or time-critical services, the processor 12 configures the hardware resources 212 according to the state that allows deep sleep. However, if the hardware resources 212 are operating under real-time or time-critical services, the processor 12 configures the hardware resources according to the state that does not allow deep sleep. In either case, the FSM decision is generated based on the operating characteristics 200 and the ML decision serving as inputs.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing device comprising:
one or more hardware components; and
at least one processor communicatively coupled to the one or more hardware components, wherein the at least one processor is configured to:
    receive one or more operating characteristics of the computing device;
    in response to determining that the one or more operating characteristics are associated with using a finite state machine engine, execute the finite state machine engine to generate a finite state machine decision based on the one or more operating characteristics, and configure the one or more hardware components based on the finite state machine decision; and
    in response to determining that the one or more operating characteristics are not associated with using the finite state machine engine, execute a machine learning engine to generate a machine learning decision based on the one or more operating characteristics, and configure the one or more hardware components based on the machine learning decision.

2. The computing device of claim 1, wherein the one or more operating characteristics comprise a power state, a performance state, one or more network conditions, a location, or any combination thereof, of the computing device.

3. The computing device of claim 1, wherein the one or more operating characteristics comprise an indication that the computing device is traveling, the indication being associated with the finite state machine engine, and the at least one processor being configured to execute the finite state machine engine in response to determining that the indication is associated with the finite state machine engine.

4. The computing device of claim 1, wherein the one or more operating characteristics comprise determining a location of the computing device, the at least one processor being configured to execute the machine learning engine in response to not being capable of determining the location of the computing device.

5. The computing device of claim 1, wherein the one or more operating characteristics comprise determining a location of the computing device, the at least one processor being configured to execute the finite state machine engine in response to determining the location of the computing device.

6. The computing device of claim 5, wherein, in response to determining that the location of the computing device is associated with a good signal quality, the at least one processor is configured to execute the finite state machine engine to generate the finite state machine decision to cause the one or more hardware components to enter a high performance state, and configure the one or more hardware components to enter the high performance state.

7. The computing device of claim 5, wherein, in response to determining that the location of the computing device is associated with a poor signal quality, the at least one processor is configured to execute the finite state machine engine to generate the finite state machine decision to cause the one or more hardware components to enter a low performance state, and configure the one or more hardware components to enter the low performance state.

8. The computing device of claim 1, wherein the at least one processor is configured to configure the one or more hardware components to switch between a high performance state and a low performance state at a lower frequency according to the finite state machine decision compared to the machine learning decision.

9. The computing device of claim 1, wherein the at least one processor is configured to execute the finite state machine engine by inputting at least a portion of the one or more operating characteristics to the finite state machine engine.

10. The computing device of claim 1, wherein the at least one processor is configured not to execute the machine learning engine in response to determining that the one or more operating characteristics are associated with using the finite state machine engine.

11. A non-transitory computer-readable medium, comprising computer-executable instructions that, when executed by one or more processors, cause the one or more processors to:
    receive one or more operating characteristics of a computing device;
    execute a machine learning engine to generate a machine learning decision based on the one or more operating characteristics;
    in response to determining that the machine learning decision and the one or more operating characteristics are associated with using a finite state machine engine, execute the finite state machine engine to generate a finite state machine decision based on the one or more operating characteristics, and configure one or more hardware components of the computing device based on the finite state machine decision; and
    in response to determining that the machine learning decision or the one or more operating characteristics are not associated with using the finite state machine engine, configure the one or more hardware components based on the machine learning decision.

12. The non-transitory computer-readable medium of claim 11, wherein the one or more operating characteristics comprise a first indication that the computing device is only executing tasks in a background of the computing device, and a second indication that the computing device is executing a time-critical service.

13. The non-transitory computer-readable medium of claim 12, wherein the computer-executable instructions causing the one or more processors to
    execute the finite state machine engine to generate the finite state machine decision based on the first indication and the second indication,
    in response to determining that the machine learning decision, the first indication, and the second indication are associated with using the finite state machine engine, execute the finite state machine engine to generate the finite state machine decision based on the first indication and the second indication, and
    configure the one or more hardware components to enter a light sleep state based on the finite state machine decision.

14. The non-transitory computer-readable medium of claim 11, wherein the one or more operating characteristics comprise a first indication that the computing device is only executing tasks in a background of the computing device, and a second indication that the computing device is not executing a time-critical service, the computer-executable instructions causing the one or more processors to execute the machine learning engine to generate the machine learning decision based on the one or more operating characteristics based on the first indication and the second indication, and in response to determining that the machine learning decision, the first indication, or the second indication are not associated with using the finite state machine engine, configure the one or more hardware components to enter a deep sleep state based on the machine learning decision.

15. The non-transitory computer-readable medium of claim 11, wherein the one or more operating characteristics comprise one or more indications of one or more actions associated with a user of the computing device.

16. The non-transitory computer-readable medium of claim 15, wherein the one or more indications are indicative of the user sleeping, the computer-executable instructions causing the one or more processors to execute the machine learning engine to generate the machine learning decision based on the one or more indications that are indicative of the user sleeping, and in response to determining that the machine learning decision or the one or more indications are not associated with using the finite state machine engine, configure the one or more hardware components to enter a deep sleep state based on the machine learning decision.

17. A method, comprising:

receiving, at an engine selector of an electronic device, one or more operating characteristics of the electronic device;

generating, by a machine learning engine of the electronic device, a machine learning decision based on the one or more operating characteristics;

generating, by a finite state machine engine of the electronic device, a finite state machine decision based on the one or more operating characteristics and the machine learning decision; and configuring, via one or more processors of the electronic device, one or more hardware components of the electronic device based on the finite state machine decision.

18. The method of claim 17, wherein the one or more operating characteristics comprise a power gate, a clock gate, a bit error rate, a packet error rate, or any combination thereof, associated with the electronic device.

19. The method of claim 17, wherein the one or more operating characteristics comprise an indication that the electronic device is executing a real-time service.

20. The method of claim 17, wherein the finite state machine decision comprises preventing the one or more hardware components from entering a deep sleep state.

\* \* \* \* \*